Sept. 25, 1956

R. E. MORGAN 2,763,915

METHOD OF ASSEMBLY AND HOLDING CLIPS
FOR JOURNAL BOX WEDGE ASSEMBLY

Filed April 2, 1953

INVENTOR.
RALPH E. MORGAN
BY
ATTORNEYS

Sept. 25, 1956

R. E. MORGAN 2,763,915

METHOD OF ASSEMBLY AND HOLDING CLIPS
FOR JOURNAL BOX WEDGE ASSEMBLY

Filed April 2, 1953

INVENTOR.
RALPH E. MORGAN
BY
ATTORNEYS

United States Patent Office 2,763,915
Patented Sept. 25, 1956

2,763,915

METHOD OF ASSEMBLY AND HOLDING CLIPS FOR JOURNAL BOX WEDGE ASSEMBLY

Ralph E. Morgan, Canton, Ohio, assignor to The Timken Roller Bearing Company, Canton, Ohio, a corporation of Ohio Application April 2, 1953, Serial No. 346,301

4 Claims. (Cl. 29—149.5)

This invention relates to improvements in methods and means for facilitating the mounting of axle journal bearing housings in journal boxes where a bearing wedge is disposed between the bearing housings and journal boxes, and it is an object hereof to provide supporting clip means for holding the said wedge in proper position during the mounting or assembly operation.

It is an object of this invention to provide means for facilitating the mounting of axle journal bearings in a journal box, such means being arranged so that the mounting operation may be accomplished easily.

It is also an object to provide means for supporting a wedge in a journal box in its proper assembled position prior to the assembly of the axle journal bearing, whereby to eliminate the danger incident to manual placement and support of the wedge heretofore found necessary.

It is an object also to provide improved clip support means which may be easily removed after completion of the assembly operation and which may be reused.

It is also an object to provide an improved method of assembly of the journal box, wedge and bearing housing.

The invention consists in the assembly of a standard A. A. R. journal box, axle journal bearing assembly, and wedge means disposed between the journal box and the bearing assembly, together with supporting clip means formed of resilient material and provided with shaped end portions for the purpose of supporting the said wedge member in proper position in the journal box. The invention also consists in the method of applying the supporting clip means, as will be hereinafter particularly described.

Figure 1:
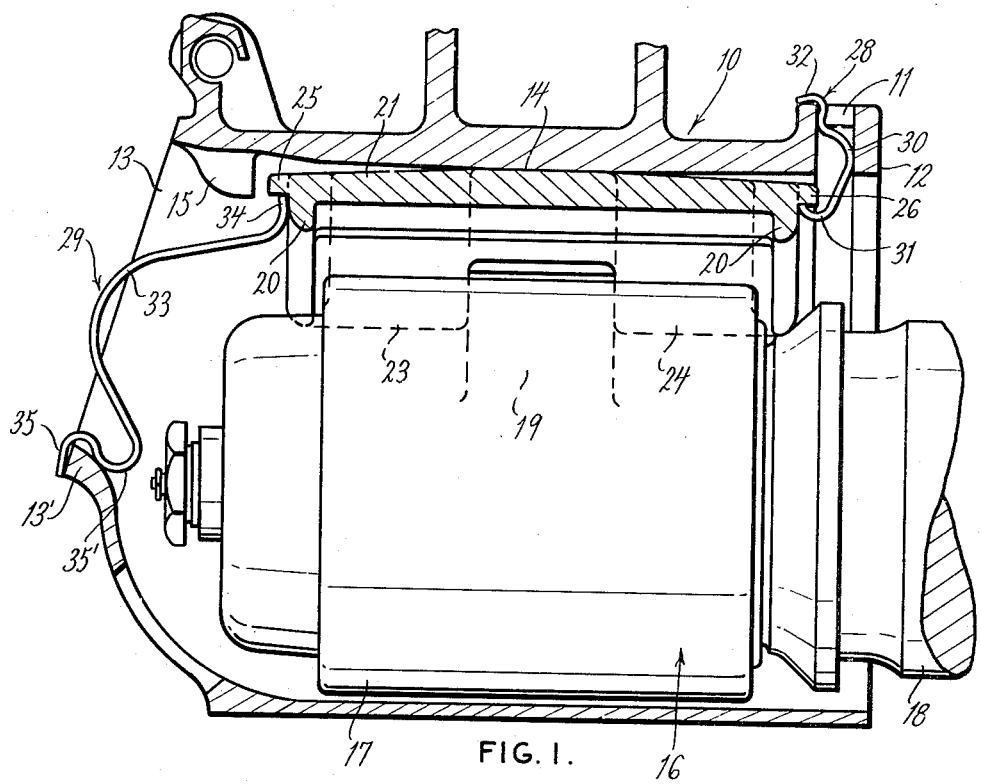
Fig. 1 is a longitudinal sectional elevational view of a typical journal box and axle journal bearing assembly disclosing the application of the improved supporting clips for the wedge member in the journal box.
Figures 2, 3:
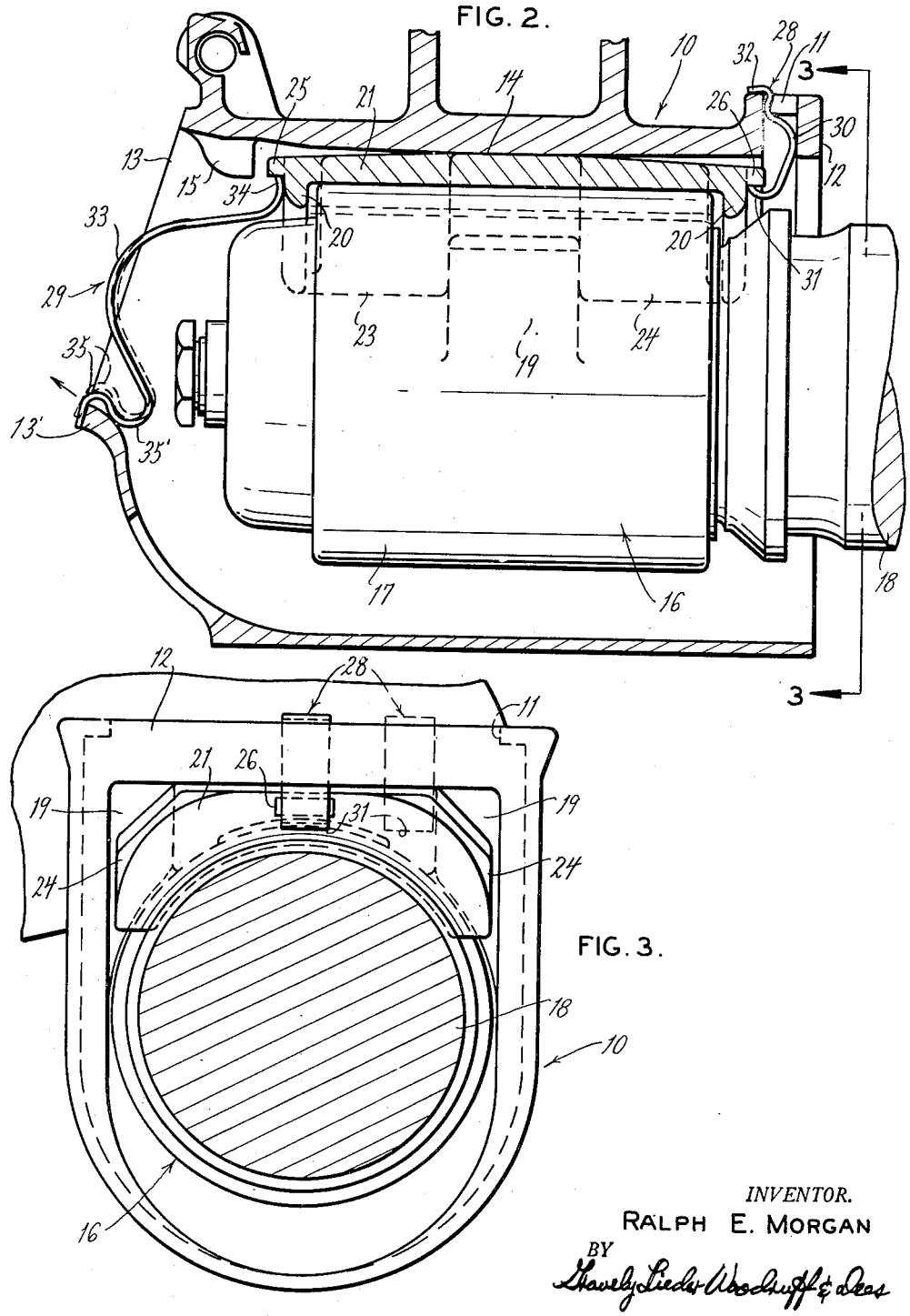
Fig. 2 is a view similar to Fig. 1, but showing the portions of the assembly in final position.
Fig. 3 is a transverse sectional elevation taken at line 3—3 in Fig. 2.

Referring to Figs. 1, 2 and 3, a typical A. A. R. integral journal box 10 is provided with a dust guard opening 11 at its innermost end 12. The opposite end of the journal box 10 is provided with an inspection opening 13, and between the ends thereof the journal box is provided with a ceiling wall 14 which extends from the dust guard opening 11 to a zone adjacent a depending thrust projection 15. The projection 15 forms no part of the present invention.

The journal bearing assembly shown at 16 includes a housing 17 which encloses suitable bearings cooperating with the journal portion of the axle 18. Journal box 10 is provided with internal lateral projections 19, there being one on each side of the housing (Fig. 3). Projections 19 are located between lugs 23 and 24 at each side of the wedge 21. The wedge 21 has depending thrust flanges 20 at its opposite ends. When properly assembled, the housing 17 is located between flanges 20 and lugs 23 and 24 on the wedge 21 are positioned on opposite sides of the internal projections 19 in the journal box 10.

The wedge 21 constitutes a load bearing and wear member which may be easily and cheaply replaced, thereby avoiding the expense of replacing the housings 17. The wedge 21, as above noted, is provided with depending lugs 23 at the outermost end and similar depending lugs 24 at the innermost end. The outermost end of the wedge between the lugs 23 is provided with a boss or projecting lip 25. In a similar manner, the innermost end of the wedge 21 is provided with a boss or projecting lip 26 which is located between the depending lugs 24.

In effecting assembly of the parts thus far described, it is necessary to locate the wedge member 21 against the ceiling wall 14 of the journal box 10 with box projections 19 embraced by the wedge lugs 23 and 24. The housing 17, having first been properly assembled on the journal portion of axle 18, may be passed through the innermost end 12 of the journal box 10 to the position shown in Fig. 1. The journal box 10 and the bearing housing 17 are then relatively displaced so that the housing 17 is received in and located adjacent the bottom of the journal box (Fig. 1). With the wedge member 21 properly positioned to receive the journal box projections 19 between the pairs of depending lugs 23 and 24, housing 17 and the journal box 10 may be relatively moved so that the housing 17 assumes the position shown in Fig. 2 between thrust flanges 20.

It is a problem, in connection with effecting assembly of the parts above described, to avoid injury to the workmen who find it necessary to reach into the journal box 10 and hold the wedge member 21 against the ceiling wall 14. The parts are heavy and not easily handled in the confining space of the journal box. The use of the clip means disclosed herein avoids the hazards and chances of personal injury in connection with manual manipulation of the parts during assembly.

In the drawings, a first hanger-type wedge support clip 28 is shown disposed in the dust guard opening 11 of the journal box 10 to suspend the innermost end of the wedge member 21. A second bracing or shoring type wedge support clip 29 is provided in the outermost end of the journal box 10 for supporting an outer end of the edge 21 during assembly of the housing 17. The clip 28 is formed of flat or strip stock of resilient material and of required thickness for supporting the weight of the wedge member 21. The clip has a width appreciably greater than its thickness to provide lateral stability and prevent canting or angular misplacement of the wedge 21. In one form, clip 28 includes a resilient portion 30 having a support end 31 and an opposed hooked end 32. In a similar way, clip 29 is also formed of flat or strip stock having resilient characteristics. The clip 29 is provided with a resilient portion 33 having a support end 34 and a hooked end 35. Except for physical size differences, clips 28 and 29 are characteristically similar.

The supporting clips 28 and 29 are applied in the following manner: The clip 28 is first disposed in the dust guard opening 11 (see Fig. 3) by placing the hooked end portion 32 thereof in the opening 11 at one side of the vertical center of the journal portion 10, such position being shown in dotted outline in Fig. 3. The wedge member 21 is next placed in the journal box 10 against the ceiling wall 14 and the clip 28 is moved laterally in the dust guard opening until the hooked end 31 thereof is able to pass underneath and engage the innermost projecting lip 26. Thus, clip 28 has supporting engagement under the lip 26 of wedge member 21 and hooked engagement adjacent a part of the dust guard opening 11 of the journal box 10.

During assembly of clip 28, it is necessary manually to support the outermost end of the wedge member 21, but once clip 28 has been moved into proper position, the second clip 29 may then be brought into position. This is accomplished by placing the support end 34 underneath the outermost lip 25 of the wedge member 21, and thereafter snapping the hooked end 35 inwardly of the inspection opening 13, specifically the lip portion 13' of this opening, so that the curved portion 35' will frictionally retain the clip 29 in position. It may be necessary to flex the portion 33 of clip 29 in this assembly operation. As a consequence of the application of the supporting clips 28 and 29 the wedge member 21 is firmly and positively supported in proper position against the ceiling wall 14 of the journal box 10 and these clips do not offer any obstruction or impedance to the assembly of the axle journal bearing housing 17 under the wedge member 21.

Figure 4:
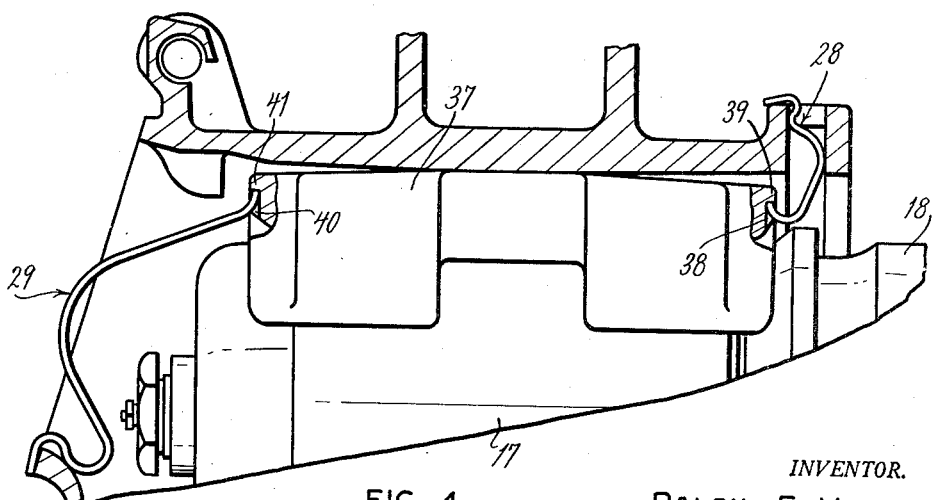
Fig. 4 is a fragmentary longitudinal sectional view showing a somewhat different arrangement for supporting the wedge member of the assembly.

Supporting clips having the characteristics above described may be utilized in connection with a somewhat modified wedge member shown at 37 in Fig. 4. This modified wedge is provided with an innermost end recess 38 having a lip portion 39 which is flush with the innermost end of the wedge instead of being projected therefrom, as is the lip 26 for wedge 21. Similarly, the outermost end of the wedge 37 is provided with a recess 40 having a lip 41 which does not project beyond the end of the wedge 37, as does the lip 25 on wedge 21. Supporting clips 28 and 29, previously described in connection with Figs. 1 and 2, may be applied to the modified wedge 37 in exactly the same manner as heretofore pointed out.

The foregoing description relates to a presently preferred assembly arrangement and method of assembly utilizing supporting clips 28 and 29, wherein the characteristics of such clips are that they resiliently support a member of a composite assembly and may be snapped into position and removed therefrom without difficulty. The clips also have the characteristic that they are made of flat or strip stock to offer lateral support, thereby avoiding tipping, canting or other angular displacement of the part to be supported during assembly. It is understood, of course, that some variations may be made in the shape or manner of application of the supporting clips 28 and 29 herein disclosed without departing from the invention hereinafter claimed.

What is claimed is:

1. The method of assembly of a load bearing wedge obscured within a railway journal box and above an axle journal bearing housing where relative movement between the journal box and bearing housing occurs through the wedge, said method including locating the wedge adjacent the internal wall, suspending one end of the wedge from the journal box with removable means and shoring the opposite end of the wedge from the journal box also with removable means to hold the wedge stationary during assembly, moving the bearing housing relative to the journal box into position below the wedge, and thereafter removing the removable means to restore relative movement between the journal box and bearing wedge.

2. Holding means for use in the assembly of axle journal bearing housings within journal boxes having load bearing wedges extending between the inner and outer ends of the journal boxes and obscured in the upper zone of the latter so as to assume positions above the axle journal bearing housings: holding means comprising removable supporting clips arranged in pairs spaced apart and adapted to be engaged between the ends of a wedge and the adjacent ends of a journal box out of the way of a journal bearing housing, each clip having a hooked end and an opposite support end, the hooked end of one clip adapted for engaging the wedge adjacent the inner end of the journal box to suspend the latter and the hooked end of the other clip adapted for engaging the outer end of the journal box and the adjacent end of the wedge to retain the wedge elevated in the upper zone of the journal box substantially immovable relative to the journal bearing housing.

3. The holding means set forth in claim 2 wherein said clips are formed from flat strip material having a width appreciably greater than its thickness, and have a resiliently flexible portion between the ends.

4. The method of assembly of a railway journal box and an axle journal bearing housing with a wedge disposed between the journal box and the bearing housing which includes applying temporary suspending and shoring means at opposite ends of the wedge to engage the journal box out of obstructing position to the bearing housing, relatively moving the journal box and bearing housing to bring the bearing housing under and upwardly in contact with the wedge, and removing the suspending and shoring means with the journal box, wedge and bearing housing in assembly.

References Cited in the file of this patent

UNITED STATES PATENTS

| | | |
|---|---|---|
| 1,613,610 | Herrmann | Jan. 11, 1927 |
| 1,618,194 | Herrmann | Feb. 22, 1927 |
| 1,809,239 | Hume | June 9, 1931 |
| 1,879,024 | Barto | Sept. 24, 1932 |
| 2,438,214 | Horger | Mar. 23, 1948 |